FIG. 3
FIG. 4
FIG. 5
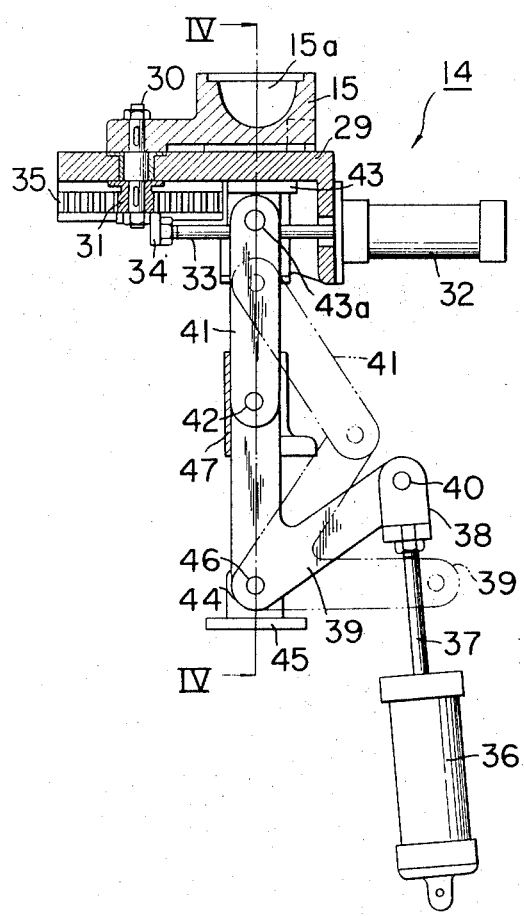
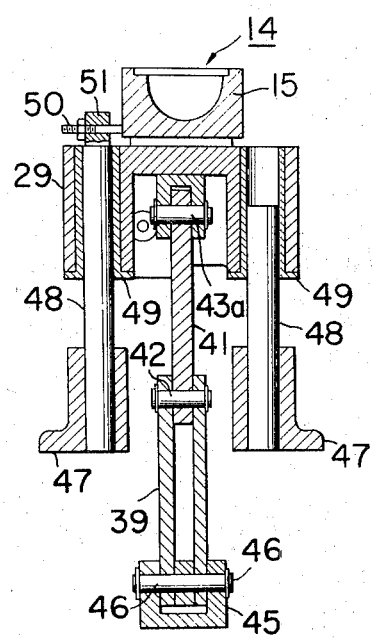
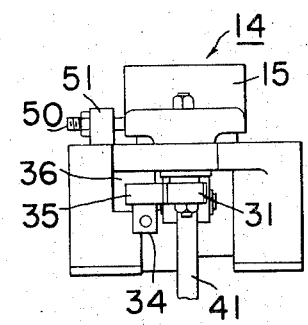

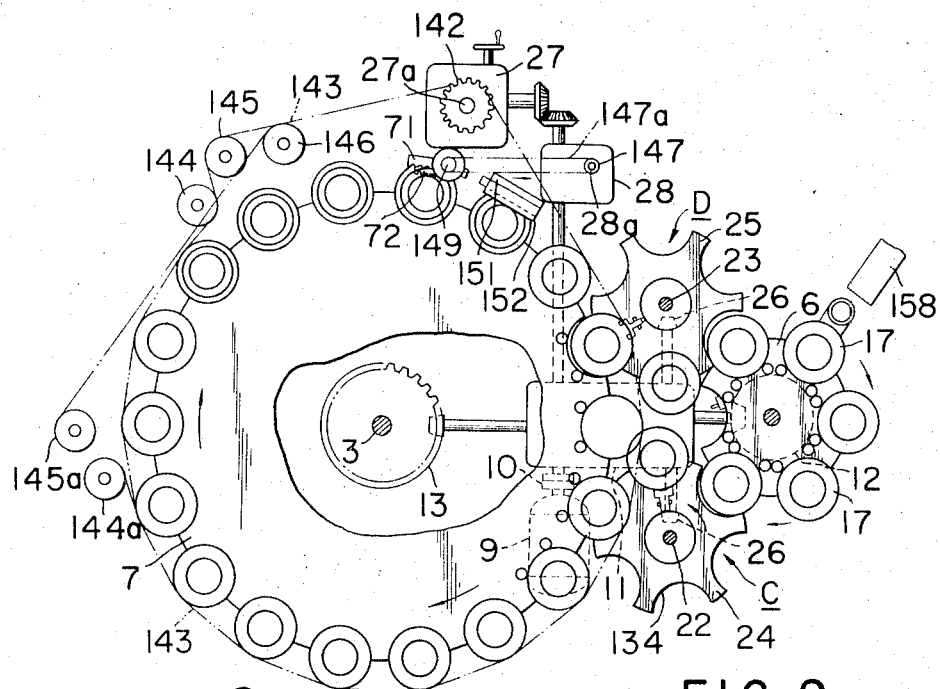
FIG. 2
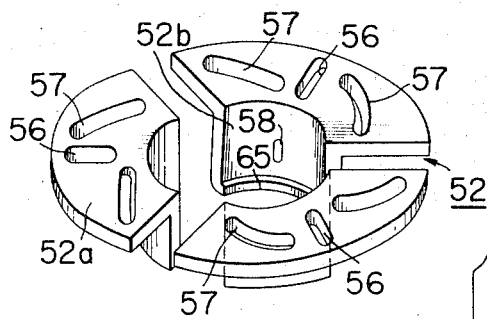
FIG. 8
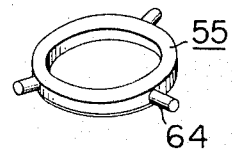
FIG. 9
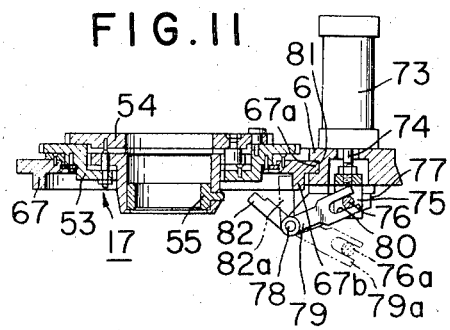
FIG. 11
FIG. 10

FIG.12 　FIG.13　FIG.14
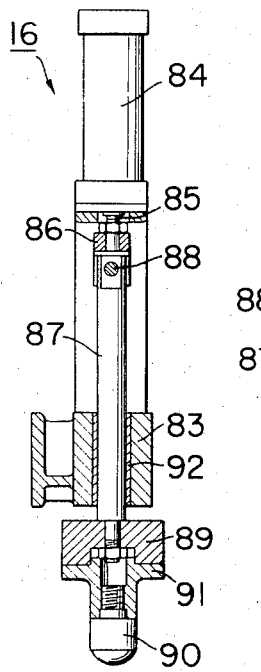
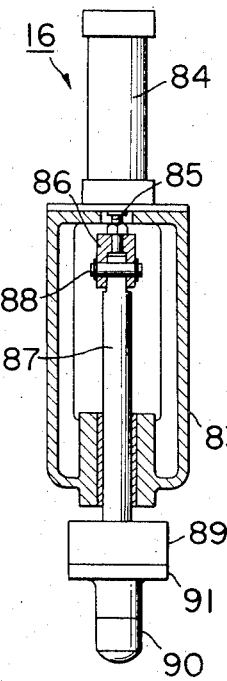
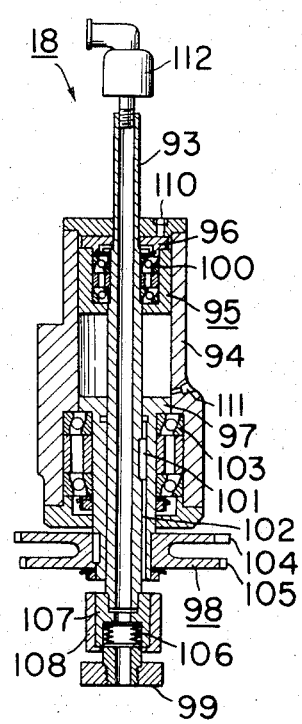
FIG.15
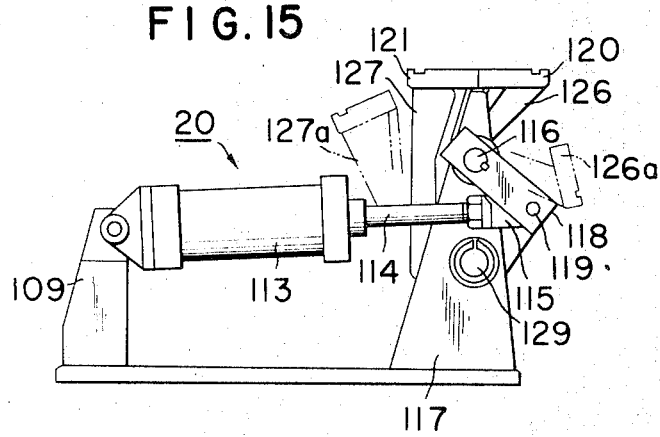

United States Patent Office 3,834,884
Patented Sept. 10, 1974

3,834,884
APPARATUS FOR BLOW-MOLDING HOLLOW
GLASSWARE IN GLASS RETAINING UNIT
Takaaki Kurokawa, Chigasaki, Junji Yamada, Yokohama, Susumu Hoshika, Tokyo-to, and Yukio Jujo, Sagamihara, Japan, assignors to Tokyo Shibaura Denki Kabushiki Kaisha, Kawasaki-shi, Japan
Filed Aug. 28, 1972, Ser. No. 284,073
Claims priority, application Japan, Sept. 6, 1971, 46/68,115
Int. Cl. C03b 9/00
U.S. Cl. 65—229                                          15 Claims

ABSTRACT OF THE DISCLOSURE

In a process and apparatus for blow-molding a hollow glassware, a glass gob received in a gob tray is preliminarily formed into a concaved flat gob with the periphery thereof retained by a glass-retaining unit, which unit, as it supports the gob, is then conveyed to a secondary forming section of the apparatus wherein the flat gob supported from the glass-retaining unit is subjected to a blow-molding operation in the course of travel through the secondary forming section of the apparatus.

BACKGROUND OF THE INVENTION

This invention relates to blow-molding techniques, and more particularly to a process for blow-molding hollow glasswares continuously and an apparatus for practicing the process.

Heretofore, various improvements have been proposed in the field of the blow-molding techniques. Some of the important examples thereof are disclosed in Japanese Pat. No. 382,245, U.S. Pat. 2,263,126, and U.S. Pat. 3,490,891. In these improvements, semi-molten glass is once taken out of a glass furnace, subjected to a primary forming process employing rollers or presses whereby the semi-molten glass is shaped to some extent for the convenience in subsequent processes and thereafter subjected to a secondary forming process in which the semi-molten shaped glass is blow-molded through a blowing pipe to a desired shape by employing a metal mold.

However, in most of these cases of blow-molding the hollow glasswares, some percentage of cullet has inevitably ocurred. The ratio of the quantity of successful products to the quantity of cullet is termed the "forming factor," and the greater the quantity of cullet, the smaller is the forming factor. In ordinary cases, this forming factor is in a range of from 20% to 50%. When the forming factor is small, the required capacity of the furnace becomes large, and economical losses, such as an increase in the fuel cost, will become inevitable.

A hollow glassware blow-molding apparatus disclosed in U.S. Pat. 3,490,981 primarily aims to reduce the cullet. However, a difficulty in this apparatus is in that a glass gob once formed in the primary forming section thereof must then be replaced onto a glass-retaining device. When the glass gob after being subjected to the primary forming step is replaced onto the glass-retaining device, the glass gob is turned upside down and is dropped onto the glass-retaining device. During this replacement, the primary forming mold is aligned with the glass-retaining device only for an instant, and at this instant, the glass gob must be dropped onto the glass-retaining device.

However, because of the possibility of error in the dropping instant of the glass gob and of error in the aligning instant of the primary forming mold and the glass-retaining device, the probability of the glass gob being correctly dropped onto the center of the glass-retaining device has been low.

Furthermore, since the primarily formed glass gob is still maintained at a comparatively high temperature for the convenience of the subsequent blow-molding steps, the above-mentioned irregularity in the replacement of the glass gob causes deformation of the glass gob, thus giving rise to undue deformation of the products and occurrence of cullet.

On the other hand, in the well known paste mold blowing machine, which is of a type causing substantially no cullet in the gob feeding process, a plunger is formed in the rotating blow head, whereby the construction thereof becomes excessively complicated. In addition, since a gob chuck includes a spring, hollow glasswares of large size and weight cannot be blow-molded successfully.

As a result of an analysis and study of mechanisms of most of the paste mold blowing machines now operating in various countries of the world, it is quite evident that a paste mold blowing machine having a gob feed mechanism of a rotatable blowing type causing substantially no cullet and adapted to produce large-size hollow glassware is urgently required.

SUMMARY OF THE INVENTION

Therefore, a primary object of the present invention is to provide a process and an apparatus for blow-molding hollow glasswares whereby the above described drawbacks of the conventional techniques can be substantially overcome.

Another object of the invention is to provide a process and an apparatus for blow-molding hollow glasswares whereby the possibility of creating cullet can be substantially eliminated.

These and other objects of the present invention can be achieved by a process for blow-molding hollow glasswares which comprises the steps of preliminarily forming a glass gob into a substantially flat gob with the periphery thereof retained in a transferable glass-retaining unit, and subjecting the flat gob, thus retained in the unit, to a blow-molding operation to form a hollow glassware.

In another aspect of the invention, there is provided an apparatus for blow-molding hollow glassware comprising: successively fed glass-retaining units; means for preliminarily forming the glass gobs successively into substantially flat gobs with peripheries retained in respective glass-retaining units; means for subjecting the flat gobs, thus retained in the units, successively to a blow-molding operation to form hollow glassware; and means for releasing the resulting glassware from their respective glass-retaining units upon completion of the corresponding blow-molding operation.

The nature, principle, and utility of the present invention will be better understood from the following detailed description of the invention when read in conjunction with the accompanying drawings, wherein like parts are designated by like reference numerals.

BRIEF DESCRIPTION OF THE DRAWINGS

In the drawings:

FIG. 2 is a plan view, with parts removed and parts broken away, showing the general arrangement of the blow-molding apparatus shown in FIG. 1;

FIG. 3 is an elevational view, partly in section, of a gob tray device included in the apparatus;

FIG. 4 is a sectional view taken along the line IV–IV in FIG. 3;

FIG. 5 is an enlarged front elevation of a part of the gob tray device shown in FIG. 4;

FIG. 8 is a perspective view showing an expansible bushing of the glass-retaining unit;

FIG. 9 is a perspective view of a glass-retaining ring of the glass-retaining unit;

FIG. 10 is a plan view indicating the principle of rotation of the glass-retaining unit and also showing racks engaging with gear wheels of the unit;

FIG. 11 is an elevational view, partly in section, of the glass-retaining unit and a supporting mechanism therefor;

FIGS. 12 and 13 are respectively front and side elevations, partly in section, of a plunger device in the primary forming section of the blow-molding apparatus;

FIG. 14 is a vertical section of a blow head device employed in the secondary forming section of the blow-molding apparatus;

FIG. 15 is an elevational view showing mold assembly of the secondary forming section of the apparatus;

DETAILED DESCRIPTION OF THE INVENTION

General Arrangement

Figure 1:
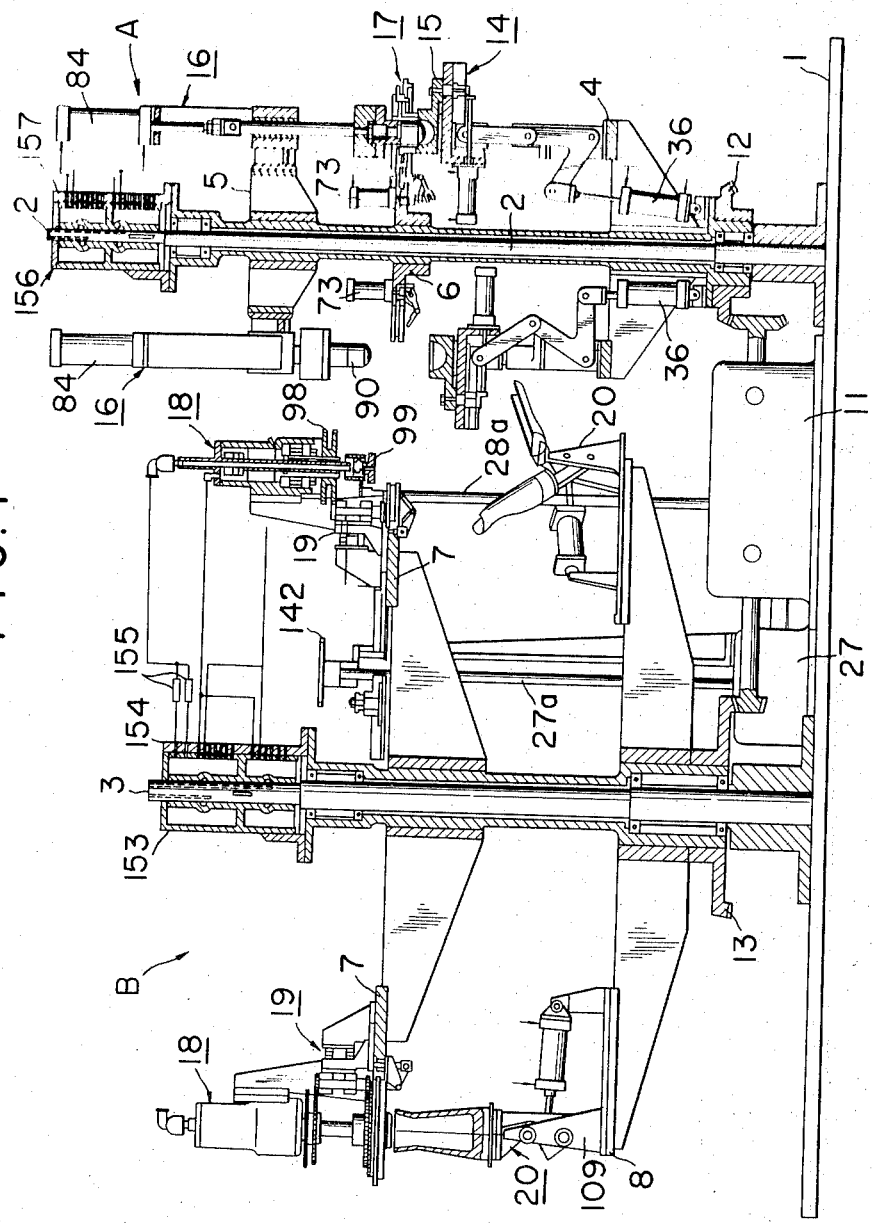
FIG. 1 is a side elevation, partly in section, of an example of a hollow glassware blow-molding apparatus constituting an embodiment of the present invention.
Figure 6:
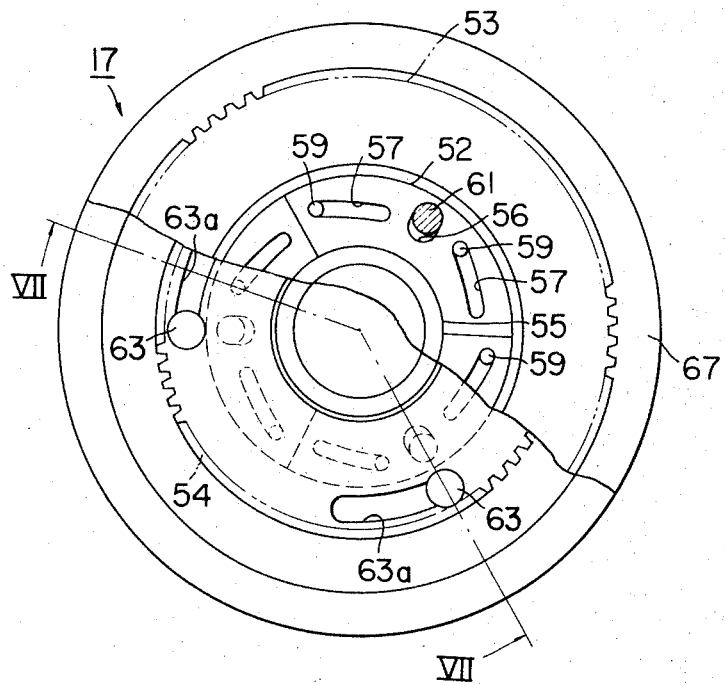
FIG. 6 is a plan view, with parts broken away, of a glass-retaining unit.

Referring now to FIGS. 1 and 2, there is illustrated an example of a hollow glassware blow-molding apparatus according to the present invention, which comprises a primary glassware forming section A and a secondary glassware forming section B. The primary glassware forming section A comprises a base plate 1, a supporting pillar 2 erected on the base plate 1, a rotating table 6 rotatably mounted on the supporting pillar 2 and having in its periphery a plurality of circumferentially equally spaced apart cutout portions (six in number in the example shown) each provided with a mechanism for detachably supporting a glass-retaining unit 17, a second rotating table 4, and a third rotating table 5, these tables 4 and 5 being also mounted rotatably on the supporting pillar 2 in concentric relationship with rotating table 6. A gob tray device 14 and a plunger device 16 are mounted on the second and the third rotating tables 4 and 5, respectively, at positions corresponding to the six cutout portions of the first rotating table 6.

The secondary glassware forming section B comprises another supporting pillar 3 erected on the base plate 1, at rotating table 7 rotatably mounted on the supporting pillar 3 and having in its periphery a plurality of circumferentially equally spaced-apart cutout portions (eighteen in number in the example shown) each provided with a mechanism for detachably supporting the glass retaining unit 17, blow-head devices 18 and interlinking mechanisms 19 also provided on the rotating table 7 at positions corresponding to the eighteen cutout portions, respectively, another rotating table 8 also rotatably mounted on the supporting pillar 3 in a concentric manner with the table 7, and mold assemblies 20 mounted on the rotating table 8 at positions also corresponding to the eighteen cutout portions of the table 7.

As is clearly shown in FIG. 2 the hollow glassware blowing apparatus according to the invention further comprises a first transfer C and a second transfer device D respectively comprising rotating tables 24 and 25 freely rotatably mounted on supporting pillars 22 and 23 and each having in its periphery a plurality of circumferentially equally space apart cutout portions (six in number in the example shown) provided with supporting mechanisms for the glass retaining unit 17. The above component devices and assemblies of the glassware blowing apparatus will now be described in more detail.

Gob Tray Device

Referring to FIGS. 3 through 5 inclusive, there is shown a gob tray device 14 mounted on the second rotating plate 4 of the primary forming section A. In a gob tray 15 of the device 14, a primary mold 15a is formed for receiving a glass gob. The gob tray 15 is fixed to one end of a pivot shaft 30 which extends through a supporting frame 29 under the gob tray 15, and is horizontally swingable about the pivot shaft 30. On the other end of the shaft 30, a pinion 31 is fixedly mounted and engages a rack 35 which is horizontally reciprocable in and along a groove formed in an elongated member 36 (FIG. 5) fixed to the supporting frame 29.

To the rack 35 there is attached an L-shaped member 34 which is in turn fixed to an end of a piston rod 33 of a piston reciprocable in a pneumatic cylinder 32 rigidly secured to the supporting frame 29. As a result, the gob tray 15 is swung around the shaft 30 through about 180° in a horizontal plane when the pinion 31 fixed to the end of the shaft 30 is rotated by the rack 35 coupled to the piston rod 33.

Another pneumatic cylinder 36 is pivotally mounted on the boss portion of the rotating table 4 (FIGS. 1 and 3). A clevis 38 is fixed to an end of a piston rod 37 of a piston slidably disposed in the cylinder 36, and a pin 40 pivotally connects the clevis 38 to one arm of a bellcrank lever 39, the other arm of which is pivotally connected to one end of a link 41 by a pin 42. The other end of the link 41 is also pin coupled to a bracket 43 at 43a on the underside of the gob-tray supporting frame 29. Furthermore, the bent portion 44 of the bellcrank lever 39 is pivotally joined by means of a pin 46 to a bracket 45 fixedly mounted on the rotating table 4.

As will be apparent from FIG. 4, the gob-tray supporting frame 29 is formed with two vertical holes through each of which is passed a bushing 49. A column 48 held vertically by a bracket 47 fixed to the rotating table 4 is slidably passed through each bushing 49. Accordingly, the gob-tray supporting frame 29 is supported on the rotating table 4 in a permitting movement in the vertical direction.

When the piston rod 37 is pulled into the cylinder 36, the bellcrank lever 39 and the link 41 are moved to positions indicated by phantom lines, whereby the gob-tray supporting frame 29 is moved down along the columns 48. Likewise, when the piston rod 33 is moved horizontally, the gob tray 15 is swung around the shaft 30 as described above. The terminal end of the swinging movement can be adjusted by a stop means consisting, for example, of an adjusting screw 50 passed through a lug 51 provided on the supporting frame 29 at a position adjacent to the gob tray 15.

Glass-Retaining Unit

Referring to FIGS. 6 through 9, inclusive, there is illustrated a glass-retaining unit 17 which comprises an expansible bushing 52, two gear wheels 53 and 54 of different diameters, and a glass-retaining ring 55. The expansible bushing 52 consists of three split pieces of identical construction, as shown in FIG. 8, whereby the entire assembly assumes a cylindrical configuration having a flange 52a at the upper end thereof. Through the flange 52a of each piece of the expansible bushing assembly 52, a radially disposed slot 56 and two cam slots 57 are cut. Through the wall of the cylindrical part 52b of the assembly 52, three through holes 58 for supporting the ring 55 are formed with equal angular spacing about the axis of the cylindrical part 52b. Each of the above-mentioned radial slots 56 and the corresponding one of the through holes 58 lie in the same plane passing through the axis of the expansible bushing assembly 52.

The gear wheel 53 having a greater diameter than that of the gear wheel 54 and located below the gear wheel 54 is provided with six upwardly extending pins 59 for insertion into the cam slots 57 of the expansible bushing 52 (these pins 59 being hereinafter called cam pins). Likewise, the gear wheel 54 is provided with three pins 61 directed downward for insertion into the radial slots 56 (these pins 61 being hereinafter called slide pins).
Michael Dorrell—24295—Aug. 15, 1974—Mach. No. 44

The surface portions of the gear wheels 53 and 54 on which the above-mentioned cam pins 59 and slide pins 61 are implanted bear against the lower surface and upper surface of the flange 52a of the expansible bushing assembly 52 through bearing plates 60 and 62 interposed between the gear wheel 53 and the lower surface of the flange 52a and between the gear wheel 54 and the upper surface of the flange 52a, respectively. Furthermore, the upper gear wheel 54 is provided with three arcuate slots 63a each forming an equal center angle as that of the cam slot 57, and three pins 63 implanted on the lower gear wheel 53 are slidably inserted in these arcuate slots 63a.

Figure 7:
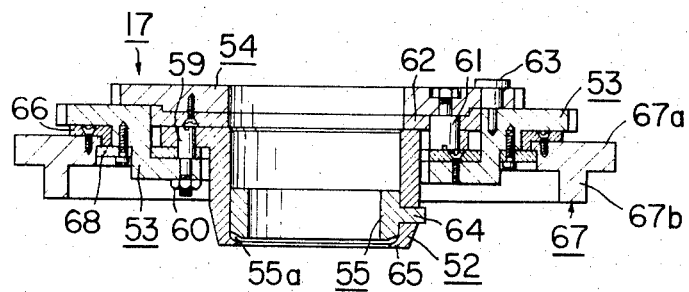
FIG. 7 is a sectional view taken along the line VII–VII in FIG. 6.

The glass-retaining ring 55 also has three pins 64 extended radially outwardly and inserted respectively in the through holes 58 of the expansible bushing 52. The ring 55 is thus supported by the expansible bushing 52 concentrically. The lower outer edge of the ring 55 is chamfered as shown in FIG. 7, whereby a suitable annular space 55a is always maintained between a radially inwardly directed lower end flange 65 of the expansible bushing 52 and the lower end of the ring 55. This annular space 55a is employed for retaining therein the upper edge of a primarily molded glassware or bulb, as will be described hereinafter. The gear wheel 53 is mounted rotatably on a bearing plate 66 which in turn is fixed on an annular frame 67 of the unit 17. There is further provided a holding plate 68 fixed to the gear wheel 53 by screws, whereby the gear wheel 53 is prevented from dropping out of the annular frame 67.

The amount of displacement of the gear wheels 53 and 54 required for closing the glass-retaining unit 17 can be calculated as follows (refer to FIG. 10). It is assumed that the radii of the gear wheels 53 and 54 are $r_1$ and $r_2$ ($r_1 > r_2$), and the gear wheels are engaged with racks 71 and 72 disposed in parallel, respectively. Under this condition, if the racks 71 and 72 are both moved in the tangential directions of the gear wheels by a distance $l$, then the rotated angle of the gear wheel 53 will be $$\frac{l}{2\pi r_1} \times 360°,$$

and the rotated angle of the gear wheel 54 will be $$\frac{l}{2\pi r_2} \times 360°.$$

The difference between angles of rotations of the gear wheels 53 and 54 required for obtaining the maximum shrinkage L of the expansible bushing 52, denoted by $\theta$, can be expressed as $$\theta = \frac{360 l}{2\pi}\left(\frac{1}{r_2} - \frac{1}{r_1}\right)$$

From this equation, the required displacement $l$ of the two gear wheels can be calculated.

Supporting Mechanisms for the
Glass-Retaining Unit

A pair of supporting mechanisms are provided on each of the six cutouts of the rotating table 6 in the primary glassware forming section A and on each of eighteen cutouts of the rotating table 7 in the secondary glassware forming section B for detachably supporting the glass-retaining unit 17 in each of the cutouts.

The construction of the supporting mechanism will now be described in detail with reference to FIGS. 1 and 2 and particularly to FIG. 11. As is apparent from FIG. 11, each of the supporting mechanisms comprises a pneumatic cylinder 73 fixedly mounted on the rotating table 6 or 7 and including a piston rod 74 having a yoke 75 at the lower end thereof. A pin 76 projects laterally from the yoke 75. On the other hand, a bracket 77 is fixed to the lower surface of the rotating table 6 or 7, and a bellcrank lever 79 having a bifurcated end 80 is pivotally mounted on the bracket 77 by means of a pivot pin 78. The above-mentioned pin 76 projecting from the yoke at the lower end of the piston rod 74 is engaged with the bifurcated end 80 of the bellcrank lever 79, whereby when the piston rod 74 reciprocates in the pneumatic cylinder 73, the pin 76 is slidably moved in the bifurcated end 80, and the bellcrank lever 79 is pivotally moved around the pivot pin 78.

Along the peripheral surface of each cutout of the rotating table 6 or 7, a circumferential groove 81 is formed, and the peripheral part 67a of the annular frame 67 of the glass-retaining unit 17 is adapted to be received in the circumferential groove 81. When the bellcrank lever 79 is swung to a position 79a indicated by phantom lines by the downward movement of the pin 76 to a position 76a, the other arm 82 of the bellcrank lever 79 is moved to a position 82a indicated by phantom lines, and the lower edges 67b of the frame 67 of the glass-retaining unit 17 is engaged by the arm 82 of the bellcrank 79 so that the peripheral part 67a of the frame 67 is received and firmly held in the circumferential groove 81.

It should be noted that the above described operation is carried out in every cutout portion of the rotating tables 6 and 7 of the primary and the secondary glassware forming sections A and B.

Plunger Device

The plunger device 16 will now be described with reference to FIGS. 12 and 13. The plunger device 16 comprises a plunger holding frame 83 fixedly mounted on the rotating table 5. On the upper surface of the holding frame 83, there is fixedly mounted a pneumatic cylinder 84 having a piston rod 85 of a piston slidably received therein. A clevis 86 is secured to the lower end of the piston rod 85, and a plunger shaft 87 is coupled at one end thereof with the clevis 86 through a pin 88. One the other end of the plunger shaft 87, a mounting block 89 is fixed, and a plunger holder 91 combined with a plunger 90 is fixed to the block 89 by means of screws. When the pneumatic cylinder 84 is operated, the plunger shaft 87 is raised or lowered in a sliding manner along the inner surface of a bushing 92 provided through the holding frame 83.

Blow-Head Device

The blow-head device 18 will now be described in detail with reference to FIG. 14. The device 18 comprises a blow pipe 93 for introducing blow air, a pneumatic cylinder 94 fixed to the rotating table 7, a piston 95 slidable in the pneumatic cylinder 94 and secured to the blow pipe 93, a piston cover 96, a sleeve 97 outside of the blow pipe 93, a wheel 98, and a mouth piece 99 of the blow pipe 93. Around the upper part of the blow pipe 93, the piston 95 with the piston cover 96 is rotatably mounted through ball bearings 100.

On the lower part of the blow pipe 93, a key 101 is provided between the pipe 93 and the sleeve 97. The key 101 is received in an axial groove 102 formed in the inner surface of the sleeve 97, whereby the blow pipe 93 can be raised or lowered relative to the sleeve 97 without relative rotation therebetween. The sleeve 97 is rotatably held in position within the cylinder 94 through ball bearings 103, and the uppermost part of the sleeve 97 closely contacts the inner surface of the cylinder 94.

The wheel 98 is made up of a sprocket wheel 104 and a gear wheel 105 in combination, and is fixedly mounted on the lower part of the sleeve 97. The gear wheel 105 has teeth of the same module and number as those of the gear wheel 54 of the glass-retaining unit 17.

The lowermost end of the blow pipe 93 is thread-engaged with a coupling 107 including a bellows 106, and, for preventing lateral deflection of the coupling 107, a guide 108 is provided on the coupling 107. The mouth piece 99 is threadedly attached to the end of the coupling 107.

When compressed air is introduced into the upper chamber in the cylinder 94 through a port 110 provided in the upper part of the cylinder 94, the piston 95 with the cover 96 descends together with the blow pipe 93. When compressed air is introduced into the lower chamber in the cylinder 94 through another port 111 provided in the side wall of the cylinder 94, the blow pipe 93 and the piston 95 are raised. Since the blow pipe 93 is made rotatable around its own axis, a rotary joint 112 must be employed at the uppermost end of the blow pipe 93. Furthermore, instead of the bellows 106, any flexible structure, made of rubber or the like, may be used, and, in order to improve the air sealing nature, the mouth piece 99 may be made of a suitably elastic material such as rubber, leather, or the like.

Mold Assembly

Figure 16:
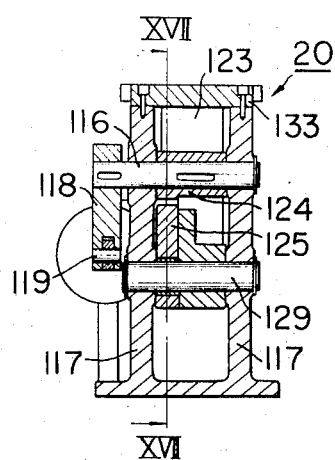
FIG. 16 is a vertical section of the mold device.
Figure 17:
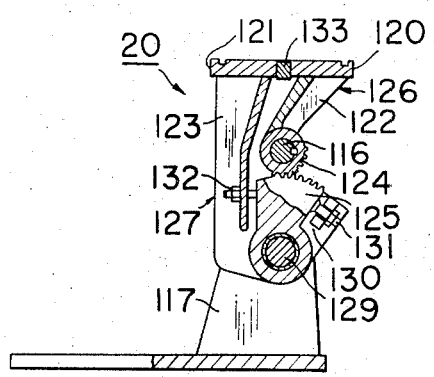
FIG. 17 is a section taken along the line XVII–XVII of FIG. 16.

The mold assembly 20 in the secondary glassware forming section B will now be described in detail with reference to FIGS. 15 through 17. A pneumatic cylinder 113 is pivotally mounted at one end thereof on a bracket 109 fixed to the rotating table 8 of the second glassware forming device B. On the other hand, there is provided another bracket 117 on the rotating table 8 and an arm 118 is pivotally mounted at an end thereof the brackets 117 by means of a pivot pin 116. The distal end of the arm 118 is coupled to a clevis 115 attached to an end of a piston rod 114 of the pneumatic cylinder 113 through a pivot pin 119.

A pair of mold supports 126 and 127 comprising respectively semicircular plates 120 and 121, arms 122 and 123 supporting thereon the semi-circular plates 120 and 121, and gears 124 and 125 provided on the arms 122 and 123, are pivotally mounted respectively on the brackets 117 through pivotal shafts 116 and 129 passing through the centers of the gears 124 and 125 in such a manner that the gears 124 and 125 are engaged with each other. For suitably adjusting the engagement between the mold supports 126 and 127, the sector gear 125 is adjusted in its position relative to the mold support 127 by means of a leaf spring 130 and bolts 131 and 132.

When the cylinder 113 is operated and the piston rod 114 is moved, the pivot shaft 116 and a gear 124 are rotated through the arm 118, whereby the sector gear 125 is also rotated, and the mold supports 126 and 127 are swung apart from each other around the respective shafts 116 and 129 to the positions 126a and 127a shown in phantom lines in FIG. 15 to open molds 166 and 167 (FIG. 26) respectively supported on the supports 126 and 127. Because of the difference between the radii of the gears 124, 125, the rotating angles of the mold supports 126 and 127 are different.

As a result, the opening angle of the mold support 127 toward the center of the rotating table 8 can be made smaller than the opening angle of the mold support 126 toward the outer periphery of the rotating table 8, whereby the removal of the hollow glassware after molding is facilitated and water cooling the molds is made easier.

On the upper part of the bracket 117, a bridging abutment member 133 is provided.

By suitably adjusting the position of the abutment member 133, the innermost closed positions of the mold supports 126 and 127 can be accurately adjusted. Furthermore, if the radius of the mold bottom is selected to be greater than the distance between the bottom of the mold and a pivotal point of the mold opening so that the pivotal point is brought onto the mold separating plane, provision of a curvature on the mold bottom is thereby made possible.

Figure 18:
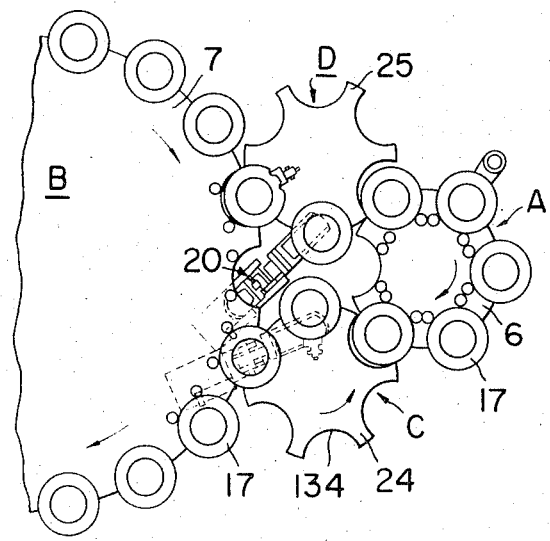
FIG. 18 is a fragmentary enlarged plan view showing an angular arrangement of the mold assembly in relation to the glass-retaining units transferred from the primary forming section to the secondary forming section of the blow-molding apparatus.

In FIG. 18, there is shown a suitable angular position of the mold assembly 20 in the secondary glassware forming section B. By the indicated disposition of the mold assembly 20, the radial extent of the entire section B can be minimized without affecting the production of the hollow glassware, and furthermore, the interior space of the apparatus can be made wider.

Transfer Devices

Figure 19:
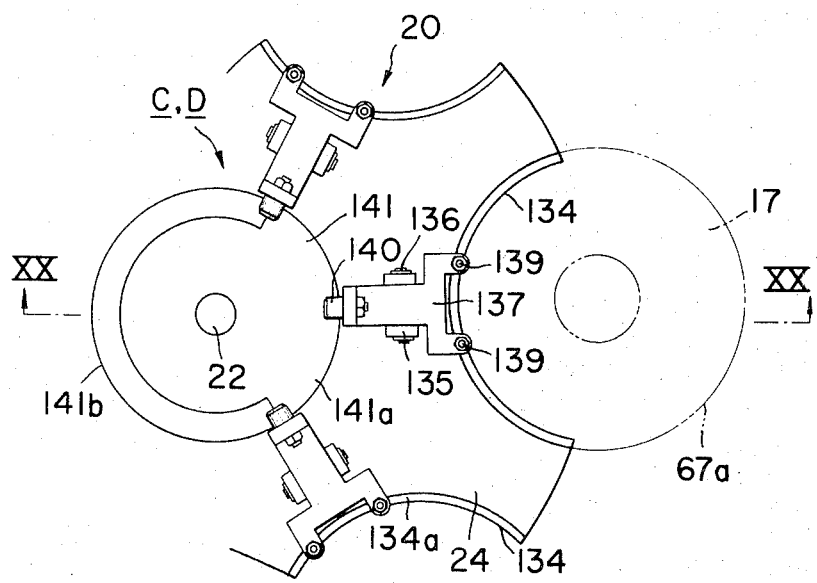
FIG. 19 is a fragmentary enlarged plan view showing a device for transferring the glass-retaining units from the primary forming section to the secondary forming section.

The glass-retaining unit transfer devices C and D will now be described with reference to FIGS. 19 and 20. A rotating table 24 rotatably mounted on the pillar 22 is driven in synchronism with the related devices in the primary glassware forming section A and the secondary glassware forming section B.

On the peripheral edge of the rotating table 24, six circular cutout portions 134 employable for temporarily receiving the aforementioned glass-retaining unit 17 are provided at equally spaced apart positions along the periphery. Adjacent each of the cutout portions 134, a bracket 135 is mounted on the rotating table 24. An arm 137 is pivotally mounted on the bracket 135 by means of a pivot pin 136. On the radially outer end of the arm 137, two depressing pins 139 each provided with a spring 138 are mounted, and on the radially inner end of the arm 137, a cam follower roller 140 is provided.

The follower 140 is engaged with a cam disc 141 also mounted on the pillar 22. The cam disc has a raised portion 141a and a lowered portion 141b. When the follower roller 140 is shifted upward by the raised portion 141a as the cam disc rotates, the arm 137 is turned clockwise as viewed in FIG. 20 and the depressing pins 139 are moved downward to depress the edge 67a of the glass-retaining unit 17 against a shoulder 134a of the cutout portion 134. It will thus be apparent that when the glass-retaining unit 17 is supplied into one of the cutout portions 134, the circumferential edge 67a of the unit 17 is seized between the shoulder 134a and the pins 139 whereby the unit 17 is held in the cutout 134. When the follower roller 140 is in the region of the lowered portion 141b, the arm 137 is resiliently turned counterclockwise as viewed in FIG. 20 and the edge 67a of the unit 17 is released from the table 24.

Driving Mechanisms

The driving mechanisms of the hollow glassware forming apparatus will be described. As shown in FIG. 1, an electric motor 9 is disposed below the tables 7 and 8. This motor 9 drives all the devices and assemblies as described hereinbefore. The output shaft of the motor is connected to a transmission mechanism 11 through a coupling 10. As is shown in FIG. 1, the output shafts of the mechanism 11 are drivingly engaged with a driving gear 12 for rotating tables 4, 5, and 6 on the pillar 2, another driving gear 13 for rotating tables 7 and 8 on the pillar 3, further driving gears 26 (FIG. 2) for rotating transfer devices C and D. The mechanism 11 is also connected to a reduction gear mechanism 27 for the blow head devices 18, and a glass-retaining unit operating transmission mechanism 28. It will be apparent that all the driven assembly and devices are driven from an electric motor 9 in a synchronized manner.

The reduction gear mechanism 27 for blow head devices 18 has an output driving shaft 27a supporting a sprocket wheel 142 which engages an endless chain 143 passed around all of the sprocket wheels 104 of the blow head devices 18 on the table 7. When the sprocket wheels 104 of the blow head devices 18 are thus rotated through the chain 143 by the reduction gear mechanism 27, the glass-retaining units 17 engaging the blow head devices 18 are thereby rotated to adapt the glassware thus blown.

Furthermore, there are provided another sprocket wheel 144 for determining the position where the rotation of the glass-retaining units 17 is to be stopped and two idler sprocket wheels 145 and 146. These sprocket wheels 144, 145, and 146 are engaged with the chain 143. Among these sprocket wheels, the sprocket wheels 144 and 145 may be so arranged that these are allowed to move along the periphery of the rotating table 7 to positions 144a and 145a. The stopping point of the rotation of the glass-retaining unit 17 can be thereby adjusted within this movable range.

In the case where the sprocket wheels 144, 145, and 146 are at positions indicated by full lines in FIG. 2, the glass-retaining units 17 are always rotated in both periods during which parisons are formed and blowing molding is carried out. However, when the sprocket wheels 144 and 145 are moved to phantom line positions 144a and 145a in FIG. 2, the glass-retaining units 17 are rotated in a period during which the parisons are formed, while the glass-retaining units 17 are not rotated in the remaining period during which the blowing operations are carried out. If the movement of the chain 143 is stopped, the blowing operations of the hollow glassware will be carried out without rotating the glass-retaining units 17.

The Opening and Closing Mechanism for the Glass-Retaining Unit

The opening and closing mechanism for the glass-retaining units 17 will now be described with reference to FIGS. 2 and 7. In FIG. 2, the glass-retaining unit operating transmission mechanism 28 has an outgoing driving shaft 28a on which a sprocket wheel 147 is mounted. A chain 147a is extended around the sprocket wheel 147 and another sprocket wheel 149, the latter being coupled to the cracks 72 and 71 (see also FIG. 10) engaged respectively with the gear wheels 53 and 54 of the glass-retaining unit 17.

Thus, when the sprocket wheel 149 is driven by the sprocket wheel 147, the racks 71 and 72 are shifted in such a manner that the expansible bushing 52 of the unit 17 is thereby opened. Furthermore, there are also provided racks 151 and 152 driven by the sprocket wheel 147 by any suitable means not shown at an immediately subsequent position of the racks 71 and 72. These racks 151 and 152 operate to close the expansible bushing 52 of the glass-retaining unit 17 at their positions.

While the expansible bushing 52 is thus opened and closed, the formed glassware is released from the glass-retaining unit 17.

Air Distributing System

Air distributing system for the various pneumatic cylinders and the blowing device will now be described with reference to FIG. 1. A compressed air reservoir 153 is mounted on the pillar 3. The supply of compressed air from the air reservoir 153 to each of pneumatic conduit lines is attained when ports cut through the wall of the reservoir 153 are aligned with ports of a distributor 154 leading to the pneumatic lines. For example, eighteen such ports are provided in the distributor 154 in an equally spaced apart relationship. The compressed air passed into each conduit line is reduced in pressure through a pressure-reducing valve 155 and is supplied to a corresponding pneumatic device. Likewise, the distribution of the compressed air in the primary glass forming section A is carried out from an air reservoir 156 provided at the top of the pillar 2 through another similar distributor 157. However, the number of ports in the distributor 157 and the reservoir 156 is six, respectively.

Operation

The processes for forming and molding hollow glasswares or glass bulbs in the above described blow-molding apparatus is as follows.

Figure 21:
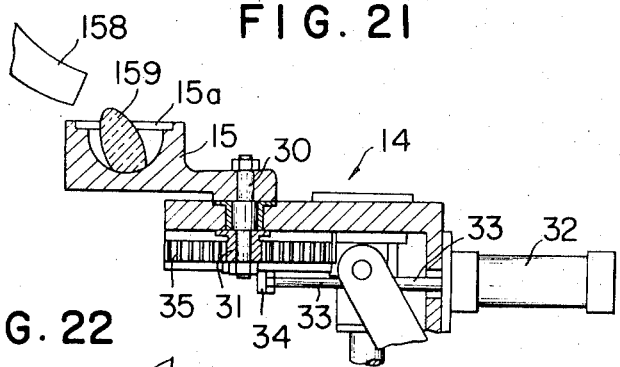
FIG. 21 is a vertical section of the gob tray device as it is receiving a glass gob therein.

When the gob tray 15 of the gob tray device 14 is swung out as shown in FIG. 21, a glass gob 159 delivered from a gob chute 158 is received in the primary mold 15a of the gob tray 15. The swinging movement of the gob tray 15 is realized by the reciprocation of the piston rod 33 of the pneumatic cylinder 32. When the piston rod 33 is shifted outward, the rack 35 fixed to the piston 33 is also moved in the same direction along the groove of the member 36 fixed to the supporting frame 29. Accordingly, the pinion 31 engaging the rack 35 is rotated, and the gob tray 15 pivoted by the shaft 30, on which is fixed the pinion 31, is swung inwardly by about 180° from the position shown in FIG. 21, so that the gob tray 15 is brought into vertical alignment with the glass-retaining unit 17 carried on the table 6 and with the plunger 90 as shown in FIG. 22.

Figure 22:
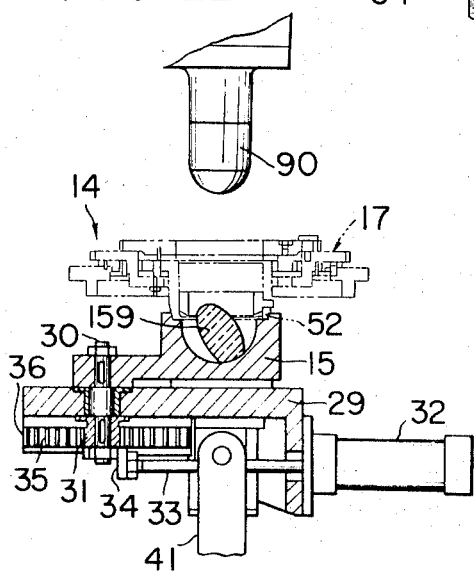
FIG. 22 is a vertical section showing relative positions of the gob tray device and the plunger device.

Then, in accordance with the upward movement of the piston rod 37 of the pneumatic cylinder 36 as indicated in FIG. 3, the gob-tray supporting frame 29 is raised through the L-shaped lever 39, link 41, and the bracket 43 fixed to the gob-tray supporting frame 29, whereby the upper surface of the primary forming mold 15a is urged against the underside surface of the glass-retaining unit 17 as shown in FIG. 22.

Figure 23:
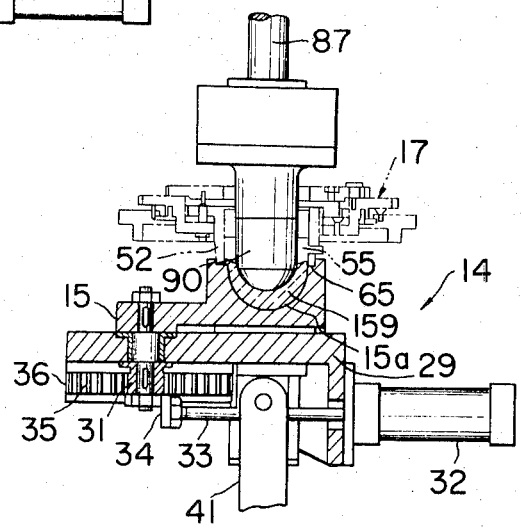
FIG. 23 is a vertical section showing a primary forming operation of the plunger device onto the glass gob received in the gob tray device.

The plunger shaft 87 driven by the pneumatic cylinder 84, and therefore the plunger 90 (FIGS. 12 and 13) are then lowered through the central opening of the glass-retaining unit 17 into the cavity of the mold 15a urged against the lower edge of the expansible bushing 52 of the unit 17, whereby the glass gob is compressed between the upper plunger 90 and the lower mold 15a, whereby the gob is formed into a concaved shape as best shown in FIG. 23. At this instant, the upper periphery of the concavely shaped glass is forced into the annular space 55a (FIG. 7) formed between the expansible bushing 52 and the lower edge 65 of the ring 55, as the glass undergoes plastic deformation due to the downward movement of the plunger 90.

The plunger shaft 87 is then lifted, and the gob-tray supporting frame 29 is lowered under the operation of the piston rod 37 of the pneumatic cylinder 36, so that the gob tray 15 is released from the underside of the unit 17. Thus, the preliminarily formed concave glass gob 159 is suspended from the unit 17 by the upper periphery thereof forced into the gap 55a between the bushing 52 and the lower edge 65 of the ring 55.

The rotating tables 4, 5, and 6 are rotated around the pillar 2 in the clockwise direction as viewed in FIG. 2, whereby the plunger device 16 and the gob-tray device 14 are also rotated around the pillar 2 together with the glass-retaining unit 17. Thus, the glass-retaining unit 17 holding or retaining the preliminarily formed concave gob 159 is transferred from within a cutout portion of the rotating table 6 of the primary forming section A into a cutout portion 134 of the rotating table 24 of the transfer device C at a position where the cutout of the table 6 and the cutout 134 of the table 24 are in mutually registered relationship (FIGS. 18 and 19).

Figure 20:
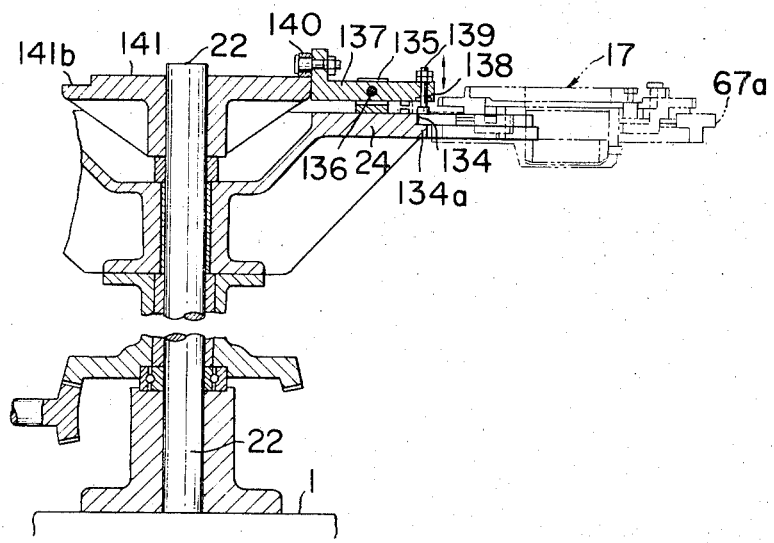
FIG. 20 is a vertical section taken along the line XX–XX of FIG. 19.

As shown in FIG. 20, at the same time that the periphery 67a of the frame 67 of the glass-retaining unit 17 is placed on the shoulder 134a of the periphery of the cutout portion 134 of the rotating table 24, the two depressing pins 139 of the arm 137 of the transfer device C are depressed against the upper surface of the periphery of the frame 67 of the unit 17 under the operation of the cam disc 141, so that the peripheral edge 67a of the frame 67 is firmly held between the two depressing pins 139 and the shoulder 134a of the cutout portion 134 of the transfer device C. The glass-retaining unit 17 held on the table 24 is transferred to the secondary forming section B.

At a place where the cutout 134 of the transfer device C is registered with a cutout of the table 7 of the secondary forming section B, the supporting mechanism for the unit 17 is released, and the unit 17 is transferred from within the cutout of the rotating table 24 to a registered cutout of the rotating table 7 of the secondary forming section B. That is, the peripheral part 67a of the frame 67 of the unit 17 is fitted into the groove 81 (FIG. 11) cut along the periphery of the cutout of the rotating table 7, and the peripheral part 67a of the frame 67 is firmly held in the groove 81 by means of the arm 82 of the bell crank lever 79 of the supporting mechanism for the glass-retaining unit 17.

Figure 24:
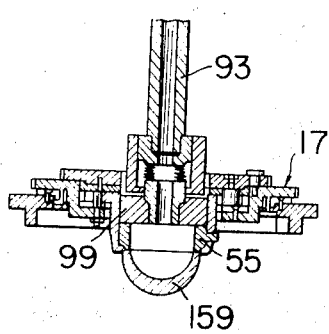
FIG. 24 is a vertical section of the blow head device engaged with the glass-retaining units.

In this condition, the blow-head device 18 disposed above the rotating table 7 and the secondary forming mold device 20 disposed below the rotating table 7 are arranged coaxially, and, the rotating table 7 is rotated in a clockwise direction as viewed in FIG. 2. As shown in FIG. 24, the blowhead is lowered from the initial position above the glass-retaining unit 17, and the tip of the blow pipe 93 is inserted into the central opening of the unit 17 so that the lower surface of the blowing mouth piece 99 provided at the tip of the blowing pipe 95 abuts the upper surface of the ring 55 of the unit 17 in an airtight manner.

Furthermore, in order to rotate the blow head in synchronism with the glass-retaining unit 17, a spring supporting member 160 (FIG. 25) is fixed to the rotating table 7, and a bracket 162 supporting a vertical shaft 163 is slidably mounted on the rotating table 7 with one side thereof facing toward the central axis of the rotating table 7 abutting buffer springs 161 provided on the spring supporting member 160.

At both ends of the vertical shaft 163, pinions 164 and 165 are provided, and the pinions 164, 165 are engaged with the gear wheel 105 on the sheel 98 provided on the blow head and with the gear wheel 54 of the glass-retaining unit 17, respectively.

In this condition, the sprocket wheel 104 of the wheel 98 is rotated by the driving means through the chain 143, whereby the unit 17 and the blow head are rotated in synchronism under a tightly coupled condition.

Figure 25:
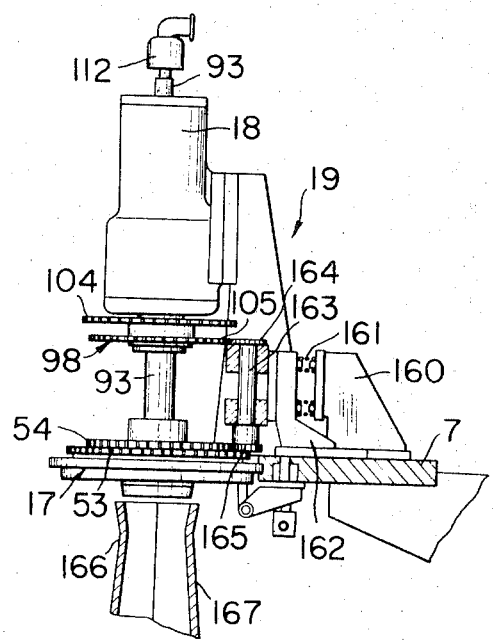
FIG. 25 is a fragmentary elevational view, partly in section of the blow-head device coupled with one of the glass-retaining devices through an interlinking mechanism.

Then, blowing air is introduced through the rotary joint 112 provided at the upper end of the blow pipe 93 as shown in FIG. 25, and a parison suspended from the glass-retaining unit 17 is thereby formed from each concave glass gob. The parison thus formed is now in the secondary forming mold pair 166 and 167.

The blow head device 18, the unit 17 and the parison are thus transported while they are rotated in unison, and the parison is formed into a hollow glassware or glass bulb conforming to the internal configuration of the mold pair 166 and 167 by subsequent blowing of air through the blow pipe 93.

Figure 26:
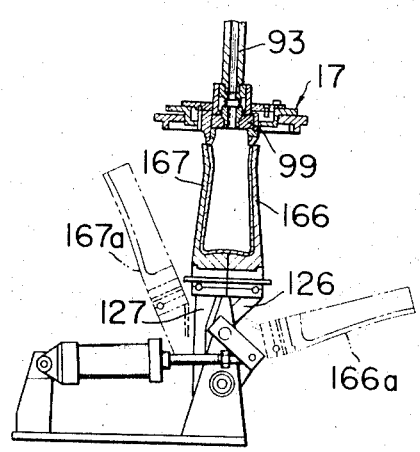
FIG. 26 is an elevational view, partly in section, of the mold assembly in the secondary forming section, wherein a parison of glass is formed to hang down from the glass-retaining unit.

When the hollow glassware has thus been formed, the secondary forming mold pair 166 and 167 are opened to the positions 166a and 167a shown in FIG. 26, respectively, and the glassware and the molds 166 and 167 are air-cooled.

At the delivering position of the secondary forming section B of the blow molding apparatus, the racks 71 and 72 are engaged with the gear wheels 54 and 53, respectively, and when these racks are moved as described hereinbefore, the expansible bushing 52 is opened or expanded, and the glassware which has been retained by the unit 17 is released because the flange 65 defining the annular space 55a in the unit 17 moves radially outwardly so that the space 55a exists no longer.

When the unit 17 is transferred to a position immediately subsequent to the delivery position, the gear wheels 53 and 54 are engaged with the racks 151 and 152, respectively, and the expansible bushing 52 is closed or contracted to the original closing state.

The glass-retaining unit 17 from which the glassware has been delivered is then transferred by the transfer mechanism D similar to the mechanism C to the primary forming section A of the blow molding apparatus, and the above described operations are repeated.

Since the glass gob primarily formed in the primary forming section of the present blow molding apparatus is held or retained by the same glass-retaining unit 17 until the blow molding procedure has been completed without changing the holding means for the glass material, the possibility of forming cullet is avoided, and hollow glasswares can be blow molded continuously with high production efficiency.

A modification of the hollow glassware blow-molding apparatus according to the present invention is shown in FIGS. 27 to 33.

Figure 27:
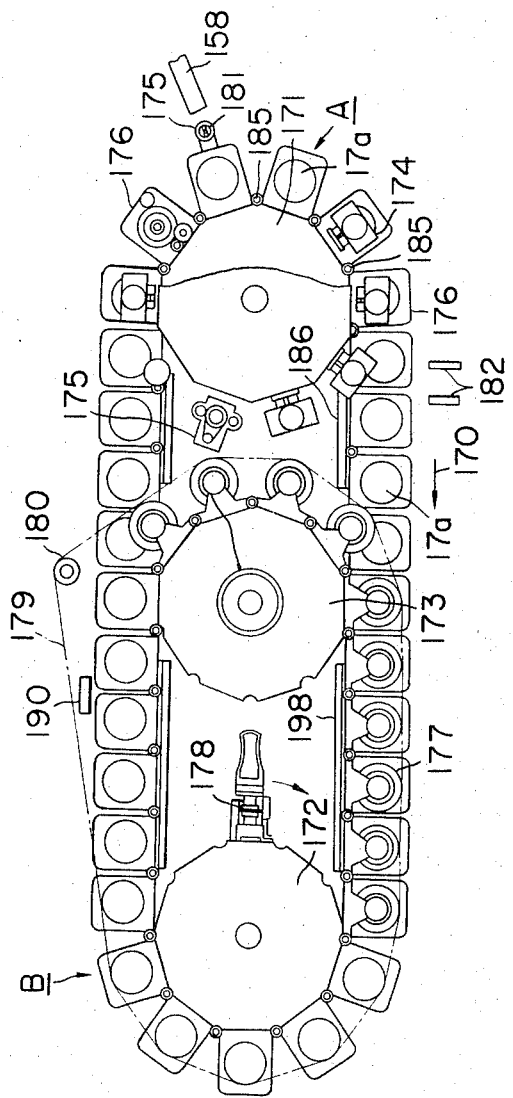
FIG. 27 is a plan view showing the general arrangement of a hollow glassware blow-molding apparatus, which constitutes a second embodiment of the invention.
Figure 28:
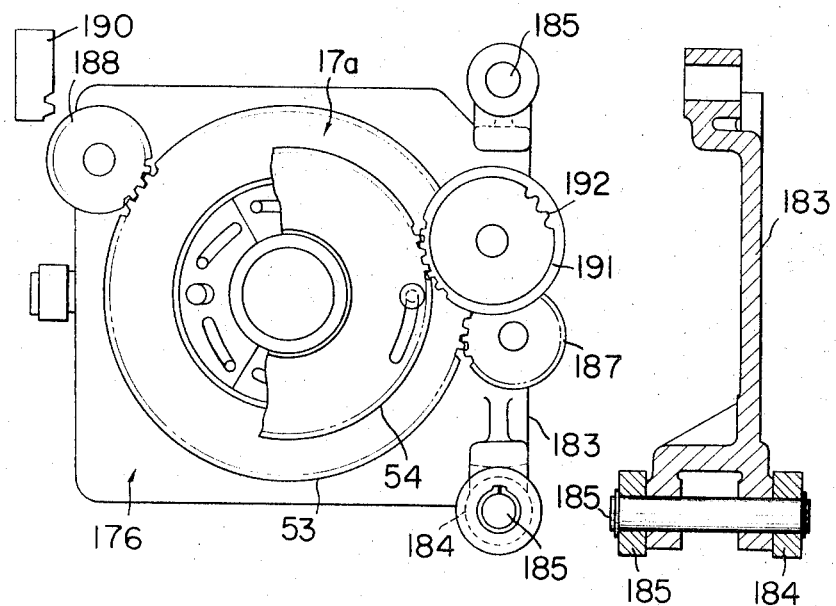
FIG. 28 is an enlarged plan view, partly broken away, of a glass-retaining plate link employed in the example shown in FIG. 27.
Figure 29:
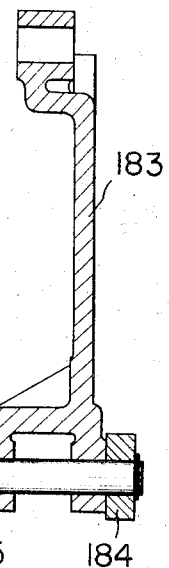
FIG. 29 is a section showing the plate link.
Figure 30:
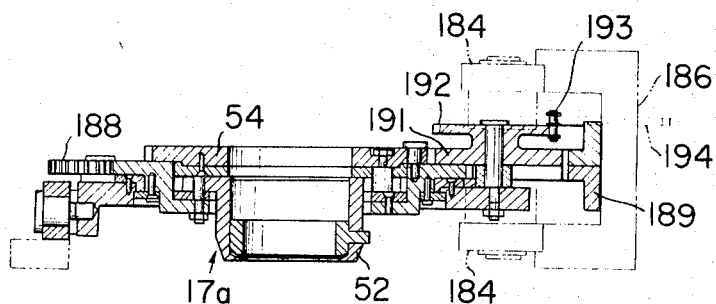
FIG. 30 is a vertical section of the glass-retaining plate link shown in FIG. 28.

With reference to FIG. 27 which is a plan view showing the modification of the invention, the fundamental arrangement of the molding apparatus and the glassware blow-forming process utilizing the apparatus are basically identical with that of the above described first embodiment of the invention. The typical advantage of this arrangement consists in that the glass-retaining units are interconnected in chain-like relationship to each other by means of a series of links so as to be suitable for mass production of the hollow glasswares.

The glass-retaining units 17a shown are of substantially same construction as the units 17 described hereinbefore and are carried on respective plate links 176 interconnected in endless chain-like relationship by means of pivot pins 185. The series of plate links 176 are so arranged to travel in one direction around the sprocket wheels 171 and 172 which are provided in the primary and secondary sections A and B, respectively. Plunger devices 174 are provided above the pass of the plate links 176, while gob tray devices 175 are provided thereunder so as to be capable of being disposed coaxially with the axes of each plate link 176 which travels around the sprocket wheel 171. The blow head devices 177 interconnected in chain-like fashion with each other are engaged with the sprocket wheels 172 and 173 and partly coextensively disposed above the chain of plate links 176 so as to travel in synchronism therewith. There are also molding devices 178 in the secondary forming section B disposed under the sprocket wheel 172 so as to be capable of being located coaxially with the respective axes of the plate links 176 which travel about the sprocket wheel 172. The blow head link devices 177 are so arranged as to be rotated by means of a sprocket chain 179 engaging with a driving sprocket wheel 180.

With reference to FIG. 27 the sequence of the hollow glassware blow-molding process will be described hereinbelow. A gob of glass 181 supplied from a chute 158 is placed in the cavity of the gob tray device 175, and then retained by the glass-retaining unit 17a on the plate link 176 after being formed into a preliminarily formed concave glass gob by the depression of the plunger device 174. In the following sequence of the operation, the preliminarily formed concave glass gob held by and suspended from the unit 17a on the plate link 176 is partly formed by means of gas burners 182 into a parison of glass, and is then blown with air by means of the blow head link device 177 which is located over the glass-retaining unit 17a on the plate link 176 to undergo a further parison formation. After the above operation, the above-mentioned primarily formed parison is housed by the mold device 178 in the secondary forming section B to undergo a final blow molding operation. Thereafter, the completed hollow glassware is taken out of the mold device 178 for cooling off, and is then released from the glass-retaining unit 17a by releasing function or opening operation of the unit 17a.

The detailed constructions of the plate link 176 and the blow head link device 177 will be described hereinbelow in conjunction with FIGS. 28 to 33.

Plate Links

The plate links are each provided with the glass-retaining unit 17a similar to that of the unit 17 used in the above described first embodiment of the invention. The link body 183 of the plate link 176 is pivotally interconnected with the mating part of the adjoining link body by means of the pivot pin 185, on which two link rollers 184 are rotatably mounted, and the thus pivotally connected link plates 176 are adapted to be fed along a rail 186 (FIGS. 27 and 30) with the link rollers 184 in rolling engagement with the guide rail 186 upon the rotation of the sprocket wheels 171 and 172.

Pinions 187 and 188 rotatably mounted on the link body 183 are so arranged to mesh with the gear wheel 53 on the glass-retaining unit 17a of the plate link as well as with the racks 189 (see FIG. 30) and 190 (see FIG. 28), respectively. When the pinion 187 is brought in mesh with the rack 189 there occurs a rotation of the gear wheel 53 in one direction, while when the pinion 188 is made engaged with the rack 190 there occurs a rotation of the gear wheel 53 in the opposite direction.

These opposite rotations of the gear wheel 53 causes opening and closing operation of the expansible bushing 52 in the glass-retaining unit 17a. Rotation of the glass-retaining unit 17a is effected by means of a pinion 191 rotatably mounted on the link body 183 and meshing with the gear wheel 54. The pinion 191 is coaxially secured with a sprocket 192 with which a row of a double-row chain 193 is in engagement. The other row of the sprocket chain 193 engages with a driving sprocket wheel 194 which provides the rotation of the glass-retaining unit. The rotation of the glass-retaining unit is of the same direction and speed as that of the blow head device.

Blow Head Link Device

Figure 31:
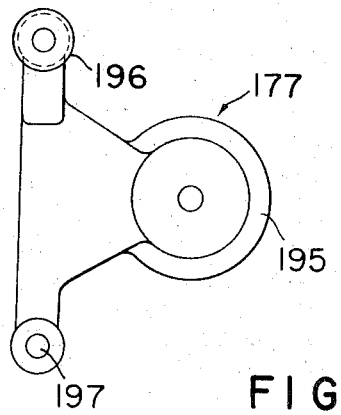
FIG. 31 is a plan view showing a blow head link device employed in the example of FIG. 27.
Figure 33:
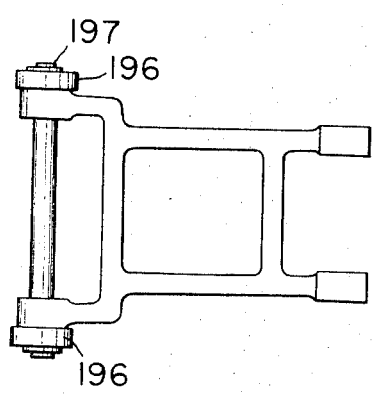
FIG. 33 is a side view of the blow head link.
Figure 32:
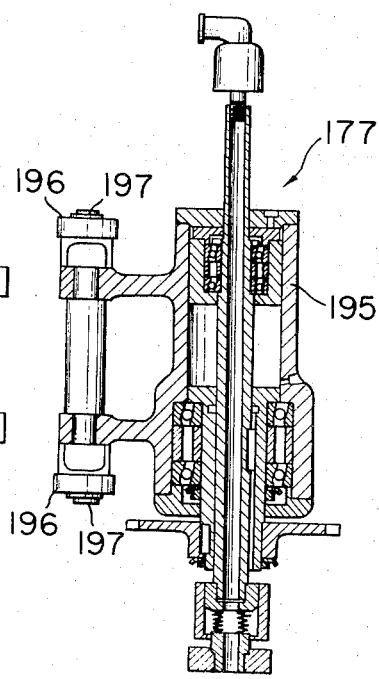
FIG. 32 is a vertical section of the blow head link device shown in FIG. 31.

The blow head link device 177 has a similar arrangement to that of the above described blow head device 18 in the first embodiment of the invention. Further details of the main components thereof are shown in FIGS. 31 to 33. The blow head link body 195 is pivotally interconnected with the adjoining blow head link body in chain-like relationship by means of a link pin 197 on which two link rollers 196 are rotatably mounted, and the thus pivotally connected blow head link devices 177 are adapted to be moved along a guide rail 198 (FIG. 27) with the rollers 196 in rolling engagement with the rail 198 under the rotation of the sprocket wheels 172 and 173. The sprocket wheels 171, 172 and 173 are arranged to rotate in synchronism as well as in the same direction with each other so that the plate links 176 may travel constantly in a direction indicated by arrow 170 in FIG. 27.

Figure 34:
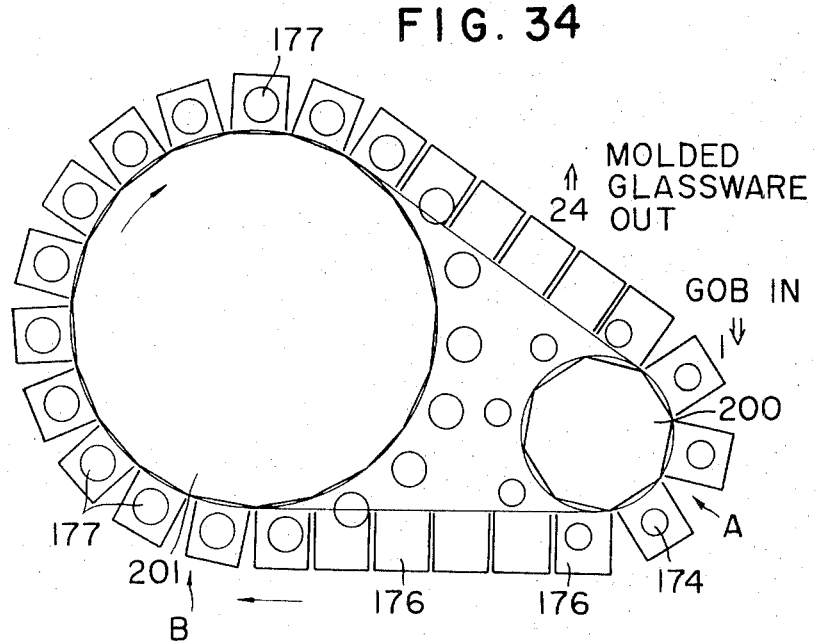
FIG. 34 is a diagrammatic plan view showing the general arrangement of a modification of the apparatus shown in FIG. 27.

FIG. 34 illustrates a further modified example of the blow molding apparatus according to the invention. In this example, the endless chain of the plate links 176 is continuously driven in the arrow direction by means of two sprocket wheels 200 and 201. The shaft of the sprocket wheel 200 is adapted to drive therearound an endless chain of links each carrying a plunger device 174 and an endless chain of links each carrying thereon a gob tray device not shown. On the other hand, the shaft of the sprocket wheel 201 is adapted to drive therearound an endless chain of blow head link devices 177 and an endless chain of mold devices not shown. The glass gob is supplied at the plate link 1 and the produced glassware is delivered at the plate link 24.

Figure 35:
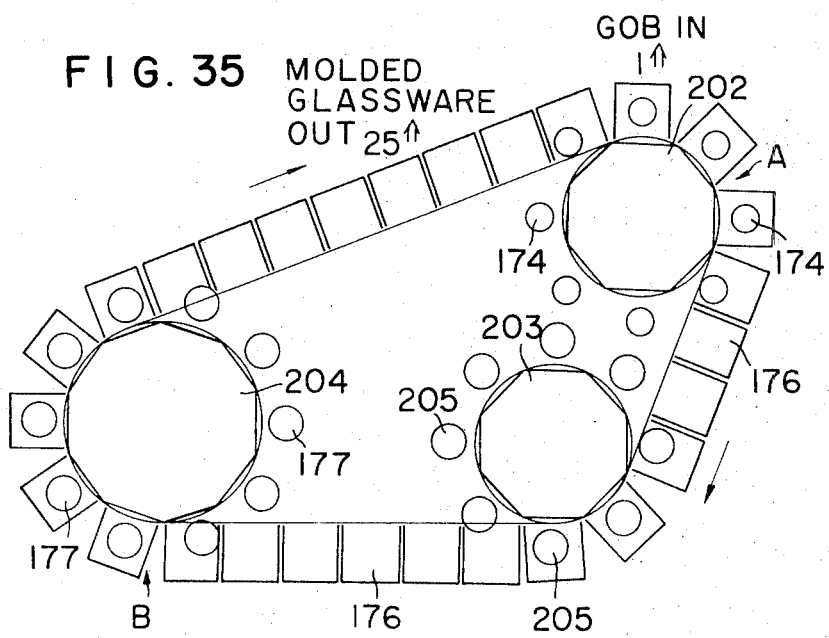
FIG. 35 is a view similar to FIG. 34, but showing a further modification of the apparatus shown in FIG. 27.

FIG. 35 shows a still further modified example of the blow molding apparatus according to the invention. In this example, the endless chain of the plate links 176 is driven in the direction of arrow by means of sprocket wheels 202, 203 and 204. Around the sprocket wheel 202 a chain of plunger devices 174 are driven, while around the sprocket wheel 204 a chain of blow head devices 177 are driven. The shaft of the intermediate sprocket wheel 203 is adapted to drive therearound an endless chain of preliminary blow head devices 205 which function to produced slightly blow-formed parisons. These parisons formed by the devices 205 are successively fed to undergo the operation of the blow head link devices 177 to be finally formed into the glasswares or glass bulbs.

We claim:

1. Apparatus for blow-molding semi-molten glass gobs into hollow glasswares, comprising:

generally annular glass-retaining units each transferable as an independent unit;

a primary glassware forming section including a horizontal circular rotating table having along the periphery thereof a series of equi-distantly spaced apart means for successively detachably carrying glass-retaining units in a horizontal attitude, means for securely holding said glass-retaining units in said carrying means during a certain phase of rotation of said table, and pairs of a gob tray device and a plunger device, each pair being associated with each glass-retaining unit carried by said table, said gob tray device and plunger device of each pair cooperating for compressing and flattening a glass gob therebetween to cause plastic flow of the gob into the associated glass-retaining unit in such a manner that the compressed and flattened gob or parison is retained at its periphery by the unit;

a transfer device located adjacent said primary forming section for successively removing the glass-retaining units retaining parisons from the table of the primary glassware forming section;

a secondary glassware forming section located adjacent said transfer device and including a horizontal circular rotating table having along the periphery thereof a series of equi-distantly spaced means for successively receiving the glass-retaining units from said transfer device and detachably supporting the glass-retaining units in a horizontal attitude, means for securely holding said units in said supporting means during a certain phase of rotation of said table of secondary section, and pairs of a mold assembly and a blow device, each pair being associated with each glass-retaining unit supported by said table of the secondary section, said mold assembly and blow head device of each pair cooperating with each other in such a manner that the blow head device is locatable for blowing air therethrough against a parison retained in the associated glass-retaining unit carried by the table of the secondary section for shaping the parison to conform to a forming cavity of the mold assembly; and means for releasing blow-molded glasswares from the glass-retaining units on said receiving and supporting means of the secondary section.

2. The apparatus of claim 1 wherein each of said glass-retaining units has an annular gap in the bottom part thereof for receiving and retaining the periphery of a parison therein.

3. The apparatus of claim 1 wherein each of said glass-retaining units comprises an expansible bushing comprising a plurality of circumferentially divided bushing sections which are radially outwardly movable away from each other, a glass-retaining ring located within the expansible bushing, the bottom edges of said bushing and ring being contoured to form therebetween an annular gap for receiving and retaining the periphery of a parison therein, power transmission means for expanding said bushing for enlarging said annular gap, and an annular frame carrying all said members thereon.

4. The apparatus of claim 3 wherein said power transmission means comprises a gear wheel means which is in camming connection with said bushing sections.

5. The apparatus of claim 1 wherein each of said detachable carrying means of the primary section and said detachable supporting means of the secondary section comprises a cutout formed in the periphery of the table and contoured to partly receive a glass-retaining unit therein, and wherein each of said means for securely holding the glass-retaining unit in the primary and secondary sections are means for pressing the glass-retaining unit in said cutout.

6. The apparatus of claim 5 wherein each cutout has a groove for receiving part of the periphery of a glass-retaining unit and said pressing means comprises a bell-crank lever with a pressing arm for pressing part of said periphery into the groove, and means for turning the bell-crank lever.

7. The apparatus of claim 1 wherein each of said gob tray devices includes a gob tray horizontally swingable around a vertical axis between a gob receiving position and a position cooperable with an associated plunger device.

8. The apparatus of claim 1 wherein said transfer device is in the form of a circular rotating table having along the periphery thereof a series of means for successively receiving and removably securing glass-retaining units.

9. The apparatus of claim 8 wherein each of said receiving and securing means comprises a cutout formed in the periphery of the table which is contoured to partly receive a glass-retaining unit therein, and means for securely holding a glass-retaining unit in said cutout.

10. The apparatus of claim 9 wherein said cutout has a shoulder for supporting thereon part of the periphery of a glass-retaining unit received in the cutout, and said securing means comprises an arm pivoted on the table and having depressing pins adapted to depress part of said periphery against said shoulder, and cam means acting on said arm for causing said arm to pivot in a manner to cause the pins to depress the unit.

11. The apparatus of claim 1 further including means for rotating a blow head device and its associated glass-retaining unit in unison while said blow head device is blowing air.

12. The apparatus of claim 11 wherein said means for rotating a blow head device and associated glass-retaining unit in unison comprises wheel means coaxially provided on each blow head device, a gear wheel coaxially provided on each glass-retaining unit, transmission means, located on the table in the secondary section and connecting said wheel means and said gear wheel, and drive means for driving said wheel means during the period of blowing air through the blow head device.

13. The apparatus of claim 12 wherein said transmission means is supported on said table in the secondary section through the intermediary of buffer spring means.

14. The apparatus of claim 12, further including another transfer device for successively removing the glass-retaining units from the table of the secondary section after blow molded glasswares are released from the glass-retaining units, and for successively transporting the units into the primary section.

15. The apparatus of claim 14 wherein said another transfer device is in the form of a circular rotating table having along the periphery thereof a series of means for receiving and removably securing glass-retaining units.

References Cited

UNITED STATES PATENTS

| | | | |
|---|---|---|---|
| 805,027 | 11/1905 | Pawling et al. | 65—239 |
| 1,854,753 | 4/1932 | Messer | 65—261 X |
| 3,244,499 | 4/1966 | Wiley | 65—361 X |
| 653,523 | 7/1900 | O'Neill | 65—307 X |
| 3,434,820 | 3/1969 | Zappia et al. | 65—361 X |
| 2,327,673 | 8/1943 | Shillinger | 65—264 X |
| 1,066,654 | 7/1913 | Rau | 65—241 X |

FRANK W. MIGA, Primary Examiner

U.S. Cl. X.R.

65—237, 236, 241, 261, 264, 307, 361, 80